United States Patent

Newson et al.

Patent Number: 6,047,900
Date of Patent: *Apr. 11, 2000

[54] VEGETATION CONTROL METHOD AND APPARATUS

[75] Inventors: Richard John Newson, Days Bay; Graham Leslie Collins, Silverstream, both of New Zealand

[73] Assignee: Waipuna International Limited, Auckland, New Zealand

[ * ] Notice: This patent is subject to a terminal disclaimer.

[21] Appl. No.: 09/227,862

[22] Filed: Jan. 11, 1999

Related U.S. Application Data

[63] Continuation of application No. 08/974,076, Nov. 19, 1997, Pat. No. 5,927,601, which is a continuation of application No. 08/545,714, Nov. 7, 1995, abandoned.

[51] Int. Cl.⁷ .............. B05B 1/24; A01M 7/00; A01M 21/00
[52] U.S. Cl. .............. 239/135; 239/172; 47/1.5
[58] Field of Search .............. 239/11, 13, 128, 239/130, 135, 146, 159, 172, 722, 723, 754; 47/1.44, 1.5

[56] References Cited

U.S. PATENT DOCUMENTS

| | | | |
|---|---|---|---|
| 213,255 | 3/1879 | Simpson | 239/130 |
| 1,728,113 | 9/1929 | Fertally, Sr. . | |
| 1,787,024 | 12/1930 | Sjostrom . | |
| 2,518,771 | 8/1950 | Gol . | |
| 2,581,678 | 1/1952 | Malin et al. . | |
| 2,589,020 | 3/1952 | North, Jr. . | |
| 3,077,701 | 2/1963 | Osmun . | |
| 3,931,931 | 1/1976 | Otis . | |
| 4,320,595 | 3/1982 | McClure et al. . | |
| 4,602,742 | 7/1986 | Penson | 239/172 |
| 4,748,769 | 6/1988 | Kolskog et al. . | |
| 5,012,608 | 5/1991 | Brown . | |
| 5,141,156 | 8/1992 | Hoy et al. | 239/135 |
| 5,297,358 | 3/1994 | Van Steen . | |
| 5,297,730 | 3/1994 | Thompson . | |
| 5,366,154 | 11/1994 | Thompson . | |
| 5,385,106 | 1/1995 | Langshaw . | |
| 5,430,970 | 7/1995 | Thompson et al. . | |
| 5,433,758 | 7/1995 | Thompson et al. . | |
| 5,927,601 | 7/1999 | Newson et al. | 239/1 |

*Primary Examiner*—James Hook
*Assistant Examiner*—Sean P. O'Hanlon
*Attorney, Agent, or Firm*—Young & Thompson

[57] ABSTRACT

A method of killing or controlling vegetation particularly along roadside berms involves the application of pressurized hot water from a moving applicator head in close proximity to the ground. The pressurized hot water is applied as jets of hot water from an applicator head at a temperature in the range of 100° C. to 110° C. and the flow rate of about 10 liters/minute supplied from one or more pumps operating at a pump pressure of between 200 to 100 psi. The apparatus is mounted on or in a vehicle such as a van, containing a water tank (1), a boiler (2) arranged to heat pressurized water supplied by a pump (4) under pressure to the boiler (2). The pump (4) is a piston pump which supplies the pressurized water through the boiler to a hand held applicator (5) or optionally a towed boom applicator (6). The hand held applicator (5) has an applicator head inside a shroud so that the pressurized hot water is applied to the surface of vegetation as jets of water within the confines of the shroud.

8 Claims, 4 Drawing Sheets

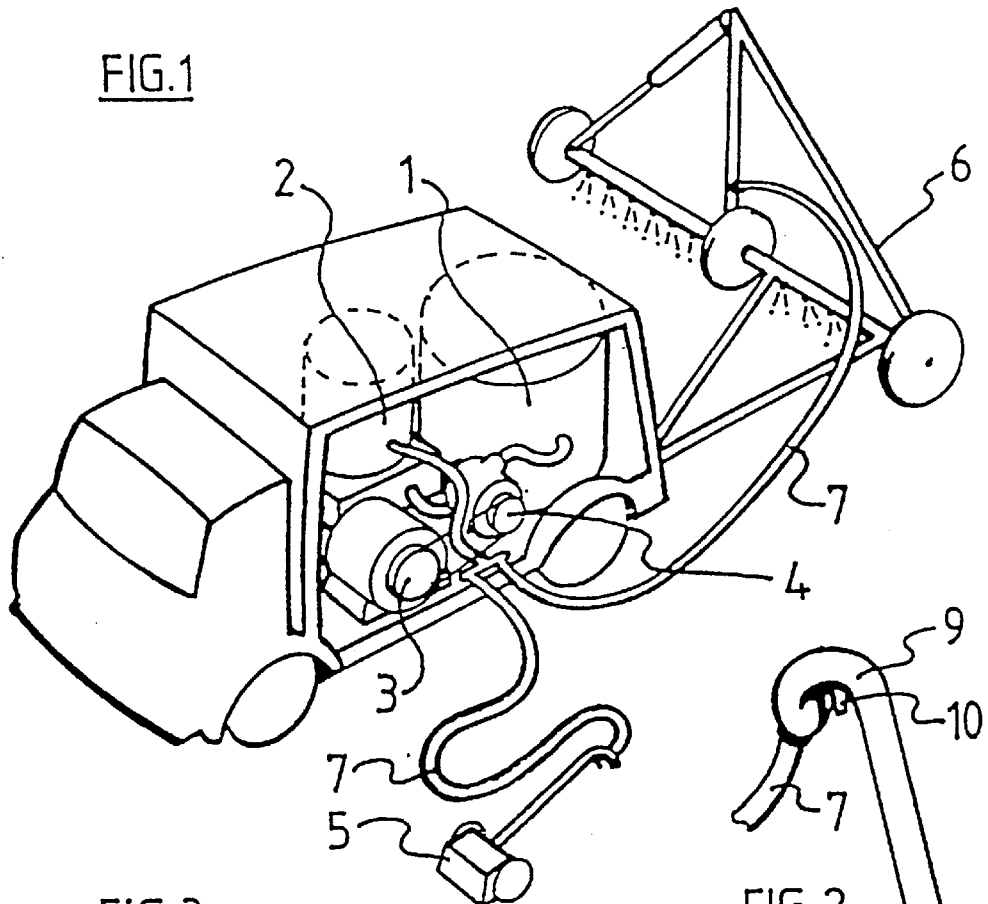
FIG.1
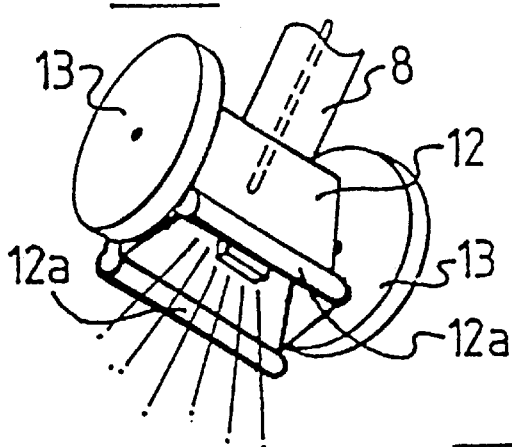
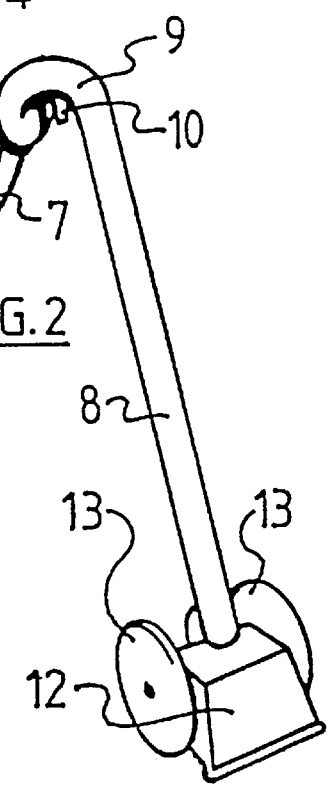
FIG.2
FIG.3
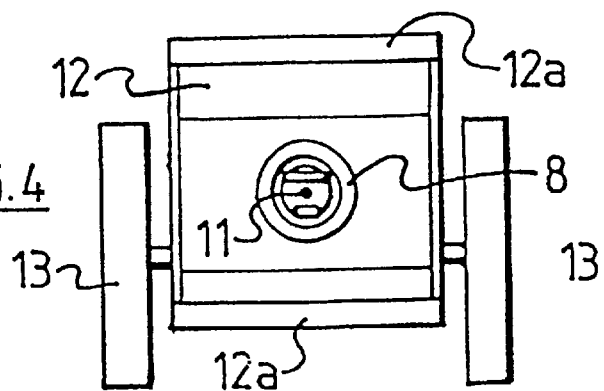
FIG.4

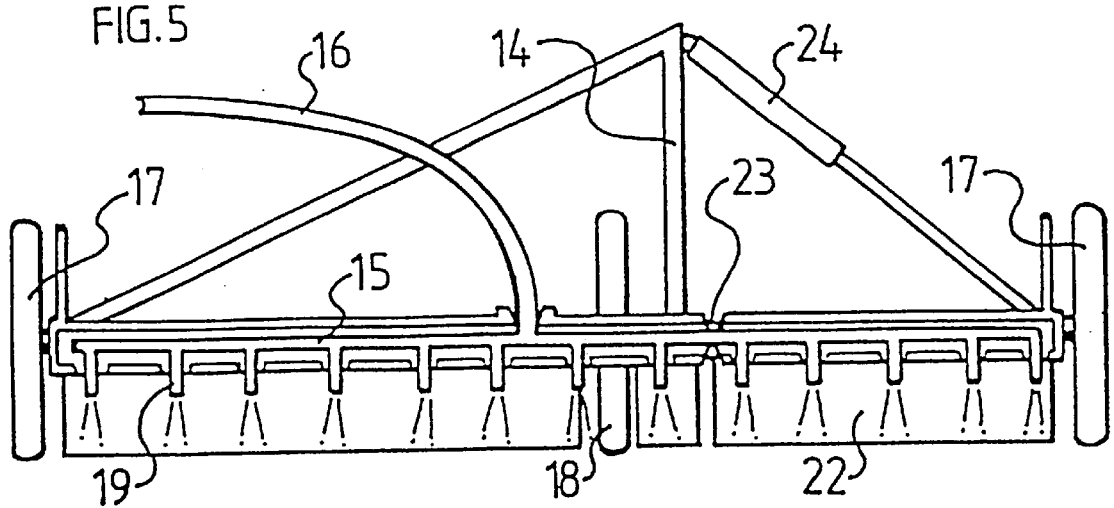
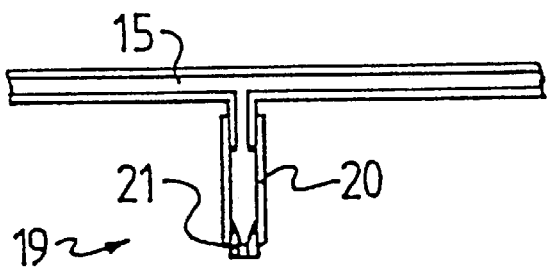
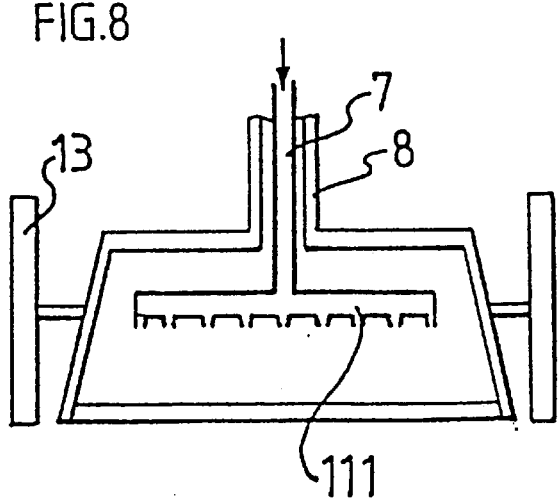
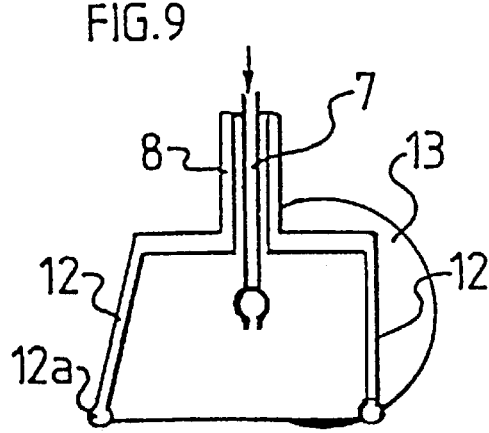

VEGETATION CONTROL METHOD AND APPARATUS

CROSS-REFERENCE TO RELATED APPLICATIONS

This application is a continuation of application Ser. No. 08/974,076, now U.S. Pat. No. 5,927,601, filed Nov. 19, 1997, which is a file wrapper continuation of Ser. No. 08/545,714, filed Nov. 7, 1995, now abandoned.

TECHNICAL FIELD OF THE INVENTION

The invention comprises a method and apparatus for killing or controlling vegetation and in particular for the control of weeds. It has particular application for the control of vegetation around trees, at the edge of concrete or paving, on roadside berms, around buildings and other obstructions, along railway lines, and other areas where the overgrowth of vegetation and in particular weeds is to be controlled.

BACKGROUND

Conventionally weed growth is controlled either by use of herbicide chemicals which are applied to the weeds by spraying or in the form of powder or granules which are sprinkled about the weeds, or alternatively by physically uprooting the weeds.

Physically removing the weeds is time consuming and labor intensive. Herbicides can be relatively expensive, and there is increasing resistance to the use of such synthetic chemicals in the environment particularly in terms of spray drift or in the seepage of such chemicals into the watertable or water supply areas. The control of roadside berms has previously been carried out by the continuous application of herbicide sprays (typically a glyphosate spray) from a moving vehicle (or in some cases from a backpack spray).

OBJECT

It is an object of this invention to provide an alternative method and apparatus for killing or controlling vegetation such as weeds, or one which will provide the public with a useful choice.

STATEMENT OF INVENTION

In a first aspect the invention comprises a method of killing or controlling vegetation, characterised in that pressurised hot water is applied to the surface of vegetation at a temperature of substantially 75° C. or above.

Preferably it is applied as steam or hot water at a temperature of substantially 90° C. or above and most preferably at a temperature in the range of 90° C. to 110° C.

In broad terms in a second aspect the invention comprises apparatus for killing or controlling vegetation, comprising means for heating water for application to vegetation to a temperature of substantially 75° C. or above, and means for applying the steam or hot water to vegetation by spraying over the weed foliage.

Preferably the apparatus comprises means arranged to maintain an outlet from which the steam or hot water is sprayed at a substantially constant spacing above the ground. Alternatively, the apparatus could comprise distance sensing means such as an electronic height indicator coupled to some form of mechanical spacer to maintain the outlet at a substantially constant spacing above the ground.

Preferably the apparatus also comprises a shroud about the outlet and extending towards the ground, to contain the steam about the outlet and about the vegetation being treated.

In one form the applicator for applying the steam or hot water to vegetation is a hand held applicator which is movable manually by an operator treating an area for weed control. The applicator may be connected by a flexible hose to a pressurized hot water unit as will be described.

In another form for treating larger areas of ground in a single pass, the applicator head may comprise a boom to be towed behind or otherwise conveyed by a vehicle over the ground, having a number of spray outlets along the length of the boom. The boom may have wheels or skids, or other ground sensing means associated with the boom for maintaining the boom and spray outlets at a substantially constant spacing above the ground.

DRAWINGS

The invention will be further described with reference to the accompanying drawings, by way of example and without intending to be limiting. In the drawings:

FIG. 1 shows a van mounting apparatus of the invention including both a manual hand held applicator and a towed boom applicator.

FIG. 2 shows a preferred form of manual hand held applicator of the invention.

FIG. 3 is a three quarter view from below of the head of the applicator of FIG. 2.

FIG. 4 is a view from immediately below of the head of the applicator of FIG. 2.

FIG. 5 is a view of the towed boom applicator from behind with parts removed.

FIG. 6 is a close up view of one outlet of the boom applicator of FIG. 5.

FIG. 8 is a cut away view from the front of the head of the applicator of the type shown in FIG. 2.

FIG. 9 is a cross sectional view through the applicator pipe and applicator head shown in FIG. 8.

PREFERRED EMBODIMENTS

Figure 7:
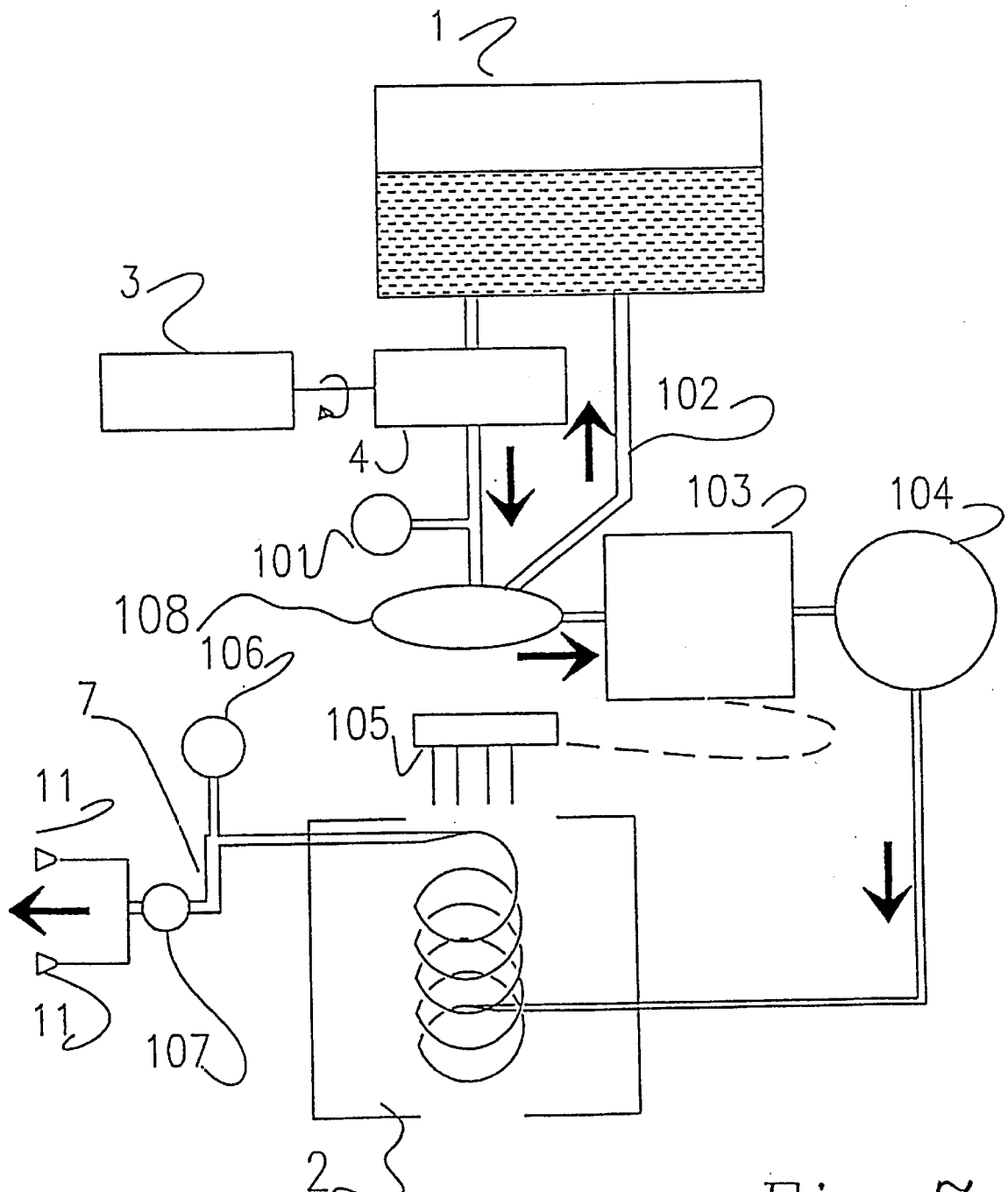
FIG. 7 is a schematic drawing of a first heater and pump configuration of this invention.

FIG. 1 shows apparatus of the invention mounted to a van. Within the van are mounted a water tank 1, a boiler 2 arranged to heat smaller volumes of water supplied by the water tank to the desired temperature, a pump 4, and a motor 3. The boiler 2 and motor 3 are powered from the battery of the van, or alternatively a separate generator with its own prime mover such as a small petrol motor could also be provided within the van to generate power for the pump motor and boiler. (In the embodiment of FIG. 10 a 6 KVA generator is used.) The pump 4 supplies cold water under pressure to the boiler 2 which supplies pressurized hot water to the hand held applicator 5 or the optional towed boom applicator 6 fed by flexible hoses 7. Any other water heating or steam generation plant could be employed. For example instead of a boiler, a water heater of the instant flow through type could be used.

The hand held applicator 5 and boom applicator 6 will be described in further detail but each provides an outlet for spraying jets of pressurized hot water over vegetation (depending on the temperature of application some of this pressurised hot water will escape as steam).

75° C. has been found to be a practical lower limit for hot water application to vegetation to substantially limit regrowth. Temperatures in excess of 90° C. and most preferably in the range 100° C. to 110° C. are preferred. At this temperature the spray from the outlet tends to be a mixture of jets or large droplets of hot water (with some steam), as opposed to a fine mist spray.

It is predominantly hot pressurized water with some wet steam (as opposed to dry superheated steam generated at higher temperatures). This wet steam and hot water jets or droplets mixture has been found most effective in spreading over the foliage and killing it and in reducing the strength of the vegetation so that they tend to go limp or collapse to the ground. Also, pressurised hot water and wet steam in this temperature range have been found to have an effective root penetration effect so that the hot water/steam tends to penetrate into the ground about the weed roots and kill the root system of the vegetation, to further delay weed regrowth. Preferably water is delivered whether in the form of hot water, or steam, or a mixture, at a rate in the range 200 to 1000 liters per hour.

FIGS. 2 to 4 and 8 and 9 show the preferred form of hand held applicator 5. It comprises a thermally insulated shaft 8 and insulated handle 9, and preferably a trigger 10 whereby the operator may turn the spray of steam/hot water on and off. The applicator is connected to the flexible hose 7 which may for example pass down inside the interior of the handle 8 to a nozzle 11 as an outlet at the base of the shaft 8, as shown in FIG. 4.

The nozzle 11 acts to deliver the hot water and steam as a series of jets or sprays. A shroud 12 suitably shaped as shown is provided about the nozzle 11 to contain the pressurised hot water and steam about the area beneath the applicator being treated at any instant as the applicator is moved over the ground, and to prevent dissipation of the steam by wind for example. The shroud may suitably by formed of metal or plastics or any other suitable material. It is preferred but not essential to employ some form of shroud. In the applicator shown in the drawings the front and rear edges of the shroud are enlarged at 12a so that they can move easily over weed foliage. Any other suitable arrangement of shroud could be employed.

To maintain the nozzle 11 at a substantially constant spacing above the ground, the applicator comprises wheels 13. The wheels 13 are fixed to the shroud 12 or to some other frame at the base of the shaft 8 which also carries the shroud 12, and are so positioned that the nozzle 11 is positioned at the desired height above the ground. It has been found most desirable that the outlet is positioned at not more than 100 millimeters above the ground for most effective operation. The spacing depends on the volume flow rate and pressure of flow through the nozzle selected and by easy experimentation the optimum or effective height may be found. In the preferred form applicator head with a hot water/steam temperature of about 100° C. and a water consumption/flow rate of 10 liters per minute, an outlet spacing from the ground of about 50 millimeters has been found to be most effective. Preferably the spray is delivered at a pump pressure of between 200 and 1,000 pounds per square inch (psi), for best effect.

In use, an operator moves the applicator over the ground by rolling it along on the wheels 13, operating the trigger 10 to spray hot water and steam onto vegetation over which he rolls the applicator. The wheels 13 ensure that the spray is applied to vegetation from the constant height.

Alternatively to the pair of wheels 13, a single wheel, or one or more skids or rollers could be employed, for example. Various other configurations of manual, hand held applicators will be apparent as variations from that described. It is also possible that to enhance penetration to the root system of the vegetation, the applicator could include one or more wheels with spikes or tines, for example mounted within the shroud 12, to penetrate the soil surface.

FIG. 5 shows the preferred form of towed boom applicator 6 from behind. The boom applicator comprises a frame 14 having a draw bar (see FIG. 1). The frame 14 forms a boom carrying a spray pipe 15 extending along the length of the boom as shown. The spray pipe 15 is connected to the hose 7 from the high pressure pump via hose 16. At either end of the frame/boom are provided ground wheels 17 which maintain a constant spacing between the boom and the ground as the boom passes over the ground. A subsidiary wheel 18 may be provided as shown.

A number of outlets 19 are provided from the spray pipe 15, with one preferred arrangement being shown in FIG. 6. Each outlet 19 comprises a short length of flexible hose 20 connected to the spray pipe and mounting a nozzle 21 at its lower end. In use hot water or steam passes through the spray pipe 15 down through the short flexible hose 20 and is ejected from the spray nozzle 21 over the ground over which the boom moves. The advantage of the flexible mounting arrangement is that each nozzle can deflect when hitting taller weeds or other obstructions. A shroud 22 formed of, for example, resilient rubber or plastic flaps or even a rigid material, may be provided on either side of the boom to shroud the spray outlets 19 along the boom and contain the spray for maximum effect. Any other suitable shroud arrangement could however be employed. In FIG. 5 the rear of the shroud has been removed so that the outlets 19 along the boom can be seen.

One or both sides of the boom may be pivotally mounted. In FIG. 5, one side of the boom is pivotally mounted at 23 so that it can pivot upwardly, as that side of the boom passes over a slope, or be pivoted upwardly by cylinder 24 to reduce the width of the boom applicator for towing when not in use, as is known for other types of agricultural equipment comprising a boom for applying herbicides or fertilizers etc.

Again, it will be clearly apparent that a boom applicator for applying hot water or steam in accordance with the invention could be otherwise arranged. For example, the boom applicator could be mounted to the front of a tractor instead of being towed. The boom could form part of a purpose built vehicle. For example, a purpose built vehicle could instead of employing a boom have a number of spray outlets on its underside between wheels at four corners of the vehicle with shrouds about the sides of the vehicle towards the ground, to spray vegetation as the vehicle is driven over them. Again in the case of a handheld applicator the water supply and water heater could be mounted to a frame to form a back pack unit, powered over a long extension cord from a main supply or a mobile generator or battery. All such variations and modifications as will be apparent are intended to be incorporated within the scope of the invention, as defined in the claims.

FIG. 7 illustrates a schematic arrangement of the pressurized hot water system of this invention, comprising a water reservoir 1 which is conveniently mounted on a vehicle, for example on the back of a utility truck, or on a trailer (or an enclosed vehicle such as that shown in FIG. 1).

A cold water reservoir 1 of any convenient size may be used, depending upon the type of vehicle, and the rate of application of the pressurized hot water. An electric motor 3 drives a piston pump 4 which supplies pressurized water to a pressure regulator 108. The pump pressure may be measured by a pressure sensor 101 (as many of the measurements described in examples refer to the pressure of the water at the pump) as opposed to the pressure of the water in the line to the applicator head (measured by pressure sensor 106). Most of the tests carried out on this invention have involved measuring the pressure at the pump using sensor 101, although some later tests have measured also the line pressure at 106. The pressure regulator 108 has a bypass line 102, capable of returning pressurised water to the cold water reservoir 1, in the event that a flow control safety valve 103 prevents the flow of water to the boiler. The flow control and safety valve 103 senses the rate of flow through the line to a non-return valve 104 and then to the flash boiler 2. The boiler 2 is preferably a flash boiler, having a down draft burner head 105 capable of supplying a down draft of hot combustion gases from a burner head 105 designed to burn pressurized fuel such as diesel droplets sprayed downwardly from head 105 into the center of the boiler coil. The pressurised hot water leaves the boiler coil is via an outlet at the top through a line 7 to one or more applicator heads 11 of the type shown in FIG. 2. Optionally, there may be a pressure sensor 106, and a temperature sensor 107 adjacent each outlet head. As shown in FIG. 7 sensors 106 and 107 are positioned in the line prior to the T-joint connecting the two applicator heads.

The unit is supplied with electrical power to drive an electric motor 3, and to supply power to the control electronics. The control electronics are not shown, but control the switching on or off of the burner head 105, and the amount of heat supplied by the burner, in conjunction with the pump pressure, and flow rate of the water within the system. The flow control and safety valve 103 is designed to monitor the flow rate, and is set to regulate the burner head 105, which will be automatically switched off if the flow rate drops below a predetermined value.

In a preferred form of this invention, the control electronics are designed to maintain the flow rate, temperature, and pressure within predetermined ranges.

As will be apparent from the examples, it is preferred that the invention operates for the most part at a flow rate of 10 liters/minute, an outlet temperature in the range of 100–110° C., and at a pump pressure in the range of 200–600 psi, which if measured close to the applicator heads will be of the order of 100–300 psi (although the pressure at the applicator head will vary depending upon the design of the machine, and in particular the type of applicator head utilised with the machine).

In most cases it has been found that these parameters are most suited to an applicator head having a spray bar of 100 mm width, containing 16 separate 1 mm holes, each hole capable of supplying a pressurised jet of hot water to the vegetation. Such an applicator head is best positioned within a shroud 12 as shown in FIG. 2, with the spray bar mounted no more than 100 mm above the bottom of the shroud, so that the spray head in use is substantially no more than 100 mm above the top of the vegetation. Typical flow rates for such a spray head are in the range of 4 to 15 liters/minute. For wider spray heads a greater flow rate will be required (eg 4 to 40 liters/minute). Even larger flow rates will be necessary for the rail mounted unit.

FIGS. 8 and 9 show cross sections through an applicator head of the type shown in FIG. 2. This has a supply line 7, and a spray head 111, at right angles to the supply line 7, mounted approximately 100 mm above the base of the shroud 12. This spray head shows nine holes drilled in the base thereof, which holes are shown exaggerated in size, although in practice they would be of the order of 0.8 mm to 1 mm in diameter, and there would be typically 16 such holes in a spray head of 100–150 mm width (width referring to the distance from one end of the spray head 111 to the other as shown in FIG. 8). Holes below 0.5 mm were found to be too small whereas holes above 1.5 mm were too large for the flow rates and pressures tested with this invention (as they were liable to flood the ground and use too much water).

FIG. 9 shows a cross-section through the head of FIG. 8, showing the relationship of the wheel 13 to the base of the shroud, showing the rounded edges 12a of the shroud, in order to minimize friction as it slides over the surface of the vegetation.

Figure 10:
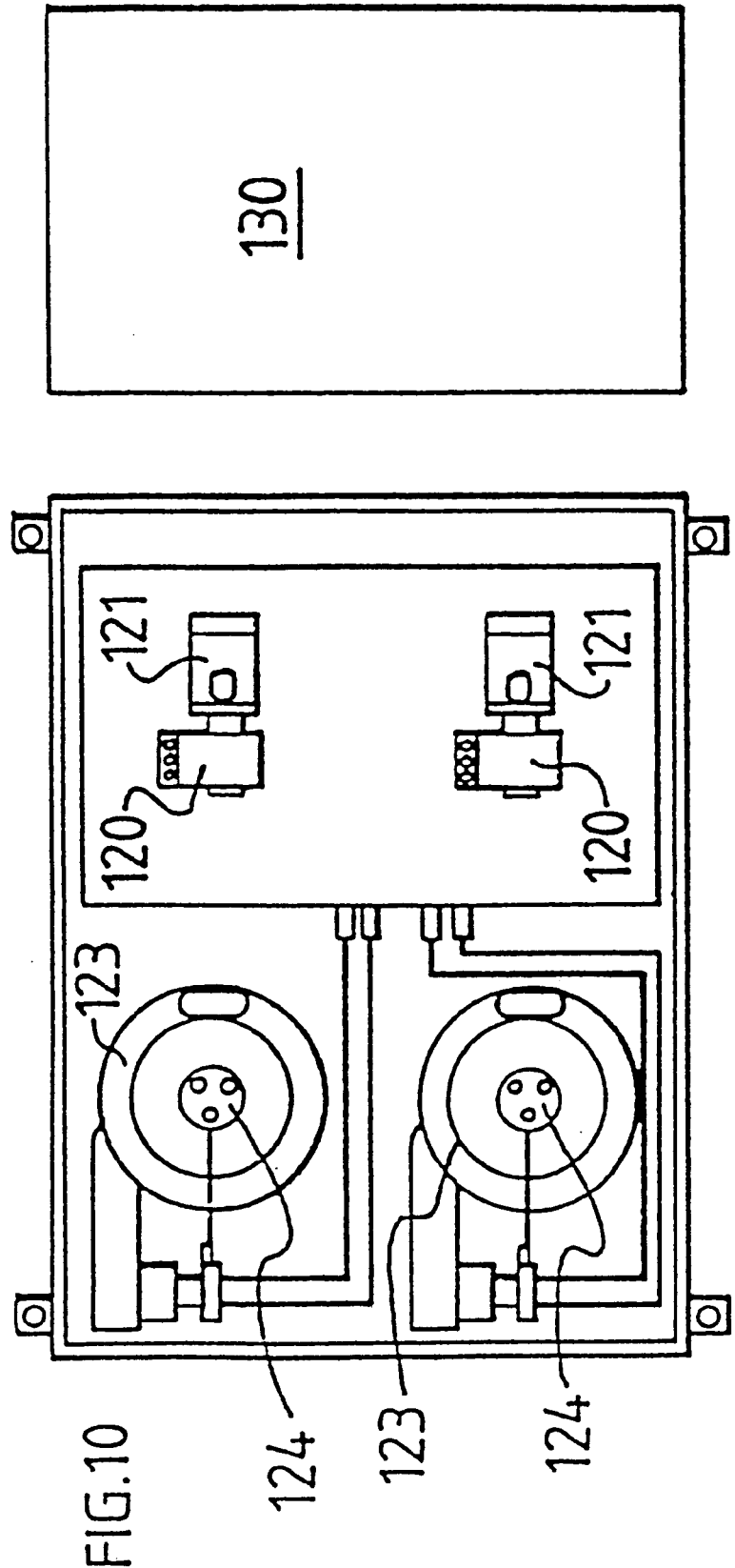
FIG. 10 is a top plan view of a second heater and pump configuration showing two boilers and two pumps and a power generator.

FIG. 10 shows a top plan view of a double burner arrangement, in which piston pumps 120 are driven by a pair of electric motors 121, and are connected to a cold water reservoir (not shown) in parallel to a pair of burners 123 each having a down draft burner head 124.

Box 130 shows the positioning of a power generator adjacent the unit containing the pumps, and twin boilers. The output from each of these boilers may be connected to an individual applicator head, or may be connected in tandem, to one or more heads, so that the burners may supply a larger flow rate of water, to one or more applicator heads.

In this configuration the power generator is preferably a 6 KVA engine/generator driving a pair of electric motors 121 each capable of supplying 2 horsepower to the piston pumps 120, which in turn are capable of supplying 13 liters/minute of water to the burners.

Each boiler/burner system 123/124 has a capacity of 130,000 kilocalories (nominal).

Rail Mounted Unit

For treatment of vegetation along a railway line, heated water is generated from large steam generators on the train to an application temperature of about 110° C. and is applied under pressure in a similar manner to the other embodiments of this invention. Water is dispersed from large holding tanks of approximately 100,000 liters or more.

The train can disperse the heated water through shrouded partitions onto the track surface and by swinging booms either side of the train. The booms will be shrouded and partitioned of a similar style to that shown in FIG. 5. The volume of heated water would be in the range of 500 liters/minute. The shrouds would be manufactured to allow a 180° swing both directions from extended position.

EXAMPLE 1

The following table shows results from one test using the method and apparatus in accordance with the invention, as compared to the commonly employed herbicide glyphosate.

| Application Conditions with Invention | |
|---|---|
| Application temperature: | 100° C. |
| Application rate (water consumption): | 750 liters/hour |
| Pump pressure: | 500 psi |
| Outlet nozzle height from ground: | 50 mm |
| Weed types: | Annual and established perennial |

TABLE 1

| Condition | Invention (time from application) | Glyphosate (time from application) |
| --- | --- | --- |
| Wilting and discolouring | Immediate | 10 days |
| Complete brown off | 4 days | 25 days |
| Visible regrowth | 60 days | 60 days |
| Regrowth cover 50% | 85 days | 85 days |
| Regrowth cover 95% | 100 days | 100 days |

Conclusion

More immediate results were seen from the invention, although eventual regrowth was similar between both treatments.

EXAMPLE 2

The following tests were carried out to confirm the efficacy of the invention, using different speeds of application in the following envelope.

Temperature: 105° C. at the outlet
Pressure: 250 psi at the pump
Volume: 10 liters/minute at the outlet
Head Size: 100 mm wide bar with 16 holes of 1 mm diameter In the following tables, a scoring system of 0–10 has been used. 10=100% regrowth whereas 0=0% growth.

TABLE 2

| | | Score (days) After Treatment | | | | |
| --- | --- | --- | --- | --- | --- | --- |
| | Speed | 5 | 20 | 30 | 60 | 90 |
| 1. | 2 kph | 0 | 0 | 0 | 3 | 8 |
| 2. | 3 kph | 0 | 1 | 2 | 7 | 9 |
| 3. | 5 kph | 1 | 4 | 6 | 8 | 10 |
| 4. | 2 kph | 0 | 0 | 0 | 3 | 8 |
| 5. | 1 kph | 0 | 0 | 0 | 3 | 6 |
| 6. | 3 kph | 0 | 1 | 1 | 5 | 8 |

Conclusion

The results clearly indicate that the maximum speed of application should not exceed 3 kph, for a volume of 10 liters/minute at the outlet nozzle, at the temperature and pressure tested above.

EXAMPLE 3

Head Size: 100 mm wide bar with 16 holes at 1 mm diameter The following tests were carried out to determine the amount of regrowth from the use of the invention, using the temperature and pressure parameters set out in Example 2.

TABLE 3

| | | Score (days) After Treatment | | | | | |
| --- | --- | --- | --- | --- | --- | --- | --- |
| Tests | | 5 | 30 | 40 | 60 | 90 | 120 |
| 1. | One Treatment | 0 | 1 | 2 | 5 | 8 | 9 |
| 2. | Two Treatments | 0 | 1 | 2 | 0 | 1 | 2 |
| 3. | One Treatment | 0 | 0 | 1 | 4 | 7 | 9 |
| 4. | One Treatment | 0 | 1 | 2 | 4 | 7 | 9 |
| 5. | Two Treatments | 0 | 0 | 1 | 0 | 0 | 2 |

Conclusion

Coupled with previous tests, it is clearly evident that a follow up treatment onto the original treatment area results in an extended time for inhibiting any regrowth.

EXAMPLE 4

This example compares dry steam from a "CLAYTON" steam generator with pressurised hot water from apparatus according to the invention as a means of vegetation control applied to similar plant species on similar soil conditions.

Soil Type: Silt and good quality thick river soil. Area consists of overgrown vegetation around trees and flax including cut grass area.

Weed Types: Species consisted of clover, ryegrass, daisy paspalum, couch, docks, thistle, creeping mellow, fennel and other unidentified varieties Weather: Fine Dry Steam Unit—"CLAYTON" Steam Generator Steam output (max)

15.6° C. feedwater 216 kg/hour

Temperature: 210° C. (Dry steam)

Dry steam at 210° C. was applied to vegetation using a hand held wand with a steam fan jet, having a steam pipe of approximately 25 mm diameter. The steam was applied approximately 5 mm to 20 mm from the vegetation growth in a sweeping motion.

Upon steam being applied to the vegetation, slight thin storked vegetation went limp or collapsed. However hardy varieties such as fennel and docks, although affected did not appear to wilt as dramatically as the next trial using hot water and/or wet steam. Results were recorded on a scale of 0 to 10. Area with no apparent living weeds would be rated as 0, and normal growth as 10.

| 2 DAYS | 7 DAYS | 14 DAYS | 21 DAYS | 30 DAYS |
| --- | --- | --- | --- | --- |
| 1 | 2 | 4 | 6 | 8.5 |

Comments

Although vegetation after 48 hours of application was in may cases affected by the dry steam, certain plants were obviously not dead. In all, this is a very disappointing result. It appears that whilst the temperature of dry steam is high at exit from the nozzle, the dry steam is not penetrating the plant structure and appears to be dissipating, and cooling too quickly.

Hot water application in accordance with this invention

In comparison, a trial using hot water on similar plants, had the following results.

Specifications of prototype Hot Water Unit: 600 liters/hour (10 liters/minute) at maximum pressure of 17.5 BAR (250 psi at the pump)

Temperature at exit: 104° C.±2° C.

Application: Shrouded 100 mm width, 15 mm pipe, 16×1 mm orifices.

Results were recorded on a scale of 0 to 10.

| 2 DAYS | 7 DAYS | 14 DAYS | 21 DAYS | 30 DAYS |
| --- | --- | --- | --- | --- |
| 0 | 0 | .5 | 1 | 2 |

Comments

Excellent results showing the effectiveness of pressurised hot water compared to dry steam. The effective weed control parameters of this machine are: temperature taken at outlet of application head 104°±2° C. pressure, 250 psi (at pump), and volume=10 liters/minute.

With the method and apparatus of the invention, vegetation may be controlled without the use of synthetic herbicides and thus in a completely environmentally friendly way. The method and apparatus of the invention have found to be surprisingly effective, achieving kill time in which vegetation are brown and clearly dead after application in the range of a few days, as opposed to one to three weeks for commonly employed herbicides. Also, the cost of synthetic herbicides is avoided. For some hardier weed species two applications of pressurized hot water about one month apart can achieve an almost total kill with no visible regrowth. It is believed that the pressurized hot water system of this invention not only kills the plant from foliage to root (except for unusually deep rooted plants) but also effectively sterilizes the top few centimeters of soil thereby killing weed seeds and weed seedlings which might otherwise be available for regrowth in the treated area.

What is claimed is:

1. An apparatus for killing or controlling vegetation that is connectable to a water source, comprising means for heating water in the absence of herbicide, means for applying the heated water without herbicide to vegetation, at least one pump supplying the heated water to said means for applying at a pressure of 100 psi or above and at a flow rate in excess of 4 liters/minute, and wherein said means for heating water heats the water to a temperature of 90° C. to 98° C.

2. The apparatus as claimed in claim 1, further comprising a hand-held applicator for applying the hot water to vegetation, movable manually by an operator in treating vegetation, said applicator comprising an applicator head housing an outlet for the heated water and means for maintaining said outlet at a substantially constant height above the ground.

3. The apparatus as claimed in claim 2, wherein the outlet is mounted on a spray bar which is substantially 100 millimeters long and carries between 8 and 16 of said outlets therealong.

4. The apparatus as claimed in claim 3, wherein each of the outlets has a hole of 0.8 to 1.5 millimeters bore.

5. The apparatus as claimed in claim 4, wherein the outlets pass a total of 10 liters/minute of water at 90° C. to 98° C. at a pressure of 100 to 300 pounds per square inch.

6. The apparatus as claimed in claim 3, wherein each of the outlets is mounted on and connected to the spray bar by means of a flexible hose.

7. The apparatus as claimed in claim 2, wherein the outlet is positioned less than 100 millimeters above a ground contacting part of said means for maintaining, and the outlet has a plurality of apertures each having a diameter in the range of 0.5 millimeters to 1.5 millimeters.

8. The apparatus as claimed in claim 1, wherein the pump delivers pressurized water at a pump pressure in the range of 200 psi to 1,000 psi.

* * * * *

UNITED STATES PATENT AND TRADEMARK OFFICE
CERTIFICATE OF CORRECTION

PATENT NO. : 6,047,900
DATED : April 11, 2000
INVENTOR(S) : Richard John Newson et al.

Page 1 of 1

It is certified that error appears in the above-identified patent and that said Letters Patent is hereby corrected as shown below:

On the title page, in Item [57], Abstract, line 8, change " 100 psi." to --1000 psi.--.

Signed and Sealed this

Fifth Day of June, 2001

Attest:

Attesting Officer

NICHOLAS P. GODICI
*Acting Director of the United States Patent and Trademark Office*